United States Patent [19]
Pedersen et al.

[11] Patent Number: 5,834,746
[45] Date of Patent: Nov. 10, 1998

[54] METHOD AND APPARATUS FOR HEATING PRODUCTS BY MEANS OF HIGH-FREQUENCY ELECTROMAGNETIC WAVES

[75] Inventors: Henning Pedersen, Boerkop; Bo Kjeld Pedersen, Silkeborg; Boerge Kjellerup, Bredsten, all of Denmark

[73] Assignees: APV Pasilac A/S, Aarhus; Tulip International A/S, Viby, both of Denmark

[21] Appl. No.: 776,746

[22] PCT Filed: Aug. 17, 1995

[86] PCT No.: PCT/DK95/00333

§ 371 Date: May 21, 1997

§ 102(e) Date: May 21, 1997

[87] PCT Pub. No.: WO96/04804

PCT Pub. Date: Feb. 22, 1996

[30] Foreign Application Priority Data

Aug. 17, 1994 [DK] Denmark ............................... 0954/94
Oct. 7, 1994 [DK] Denmark ............................... 1168/94

[51] Int. Cl.[6] ................................................. H05B 6/54
[52] U.S. Cl. .................. 219/771; 219/779; 219/780; 219/775; 426/244; 99/451; 99/358
[58] Field of Search ........................... 219/772, 771, 219/770, 775, 779, 780; 426/243, 244, 241; 99/DIG. 1, 451, 358

[56] References Cited

U.S. PATENT DOCUMENTS

| | | | |
|---|---|---|---|
| 2,783,350 | 2/1957 | Pircon | 219/775 |
| 3,214,562 | 10/1965 | Sargeant | 219/772 |
| 3,309,488 | 3/1967 | Francis | 219/772 |
| 3,327,086 | 6/1967 | Cable | 219/770 |
| 4,221,950 | 9/1980 | Lamberts et al. | 219/779 |
| 4,406,070 | 9/1983 | Preston | 219/779 |
| 4,546,226 | 10/1985 | Trembley et al. | 219/772 |

FOREIGN PATENT DOCUMENTS

| | | |
|---|---|---|
| 0 128 397 | 12/1984 | European Pat. Off. . |
| 0 439 696 | 8/1991 | European Pat. Off. . |
| 0 457 179 | 11/1991 | European Pat. Off. . |
| WO88/02222 | 4/1988 | WIPO . |
| WO92/22180 | 12/1992 | WIPO . |

*Primary Examiner*—Philip H. Leung
*Attorney, Agent, or Firm*—Jacobson, Price, Holman & Stern, PLLC

[57] ABSTRACT

The invention relates to a method for the heat treatment of meat products in a feeding element (4) by means of high-frequency electromagnetic waves, and an apparatus for the execution of the method. The invention also relates to an advantageous application of an apparatus according to the invention. The object of the invention is to increase the depth of penetration of the electromagnetic waves in a product which is to be heated or boiled, where the electrodes (2, 3; 20, 22) are external and placed on the outside of the feeding element (4). The object is achieved by placing a product electrode (15) in the feeding element (4), in that said product electrode (15) serves as a short-circuiting element and is of a material having an electrical conductivity which is better than that of the product that is required to be heat treated.

10 Claims, 2 Drawing Sheets

METHOD AND APPARATUS FOR HEATING PRODUCTS BY MEANS OF HIGH-FREQUENCY ELECTROMAGNETIC WAVES

BACKGROUND OF THE INVENTION

The invention relates to a method and apparatus for the heating of products.

It is known in several different connections to heat products by means of microwaves. The different techniques are used for different purposes, ranging as widely as from the drying of wood to the heat treatment of meat products and dairy products. Probably the best-known technique is in connection with microwave ovens, which have become a consumer commodity.

However, the hitherto-known techniques suffer serious disadvantages, and these are amplified and particularly pronounced in connection with large-scale operations.

From DK patent application no. 4718/86 it is known to continuously lead meat products through feeding elements, for example a tube, on which electrodes are mounted on diametrically-opposite sides. Before the meat products are fed to the active zone, the air contents are removed using a vacuum pump.

From DK patent application no. 1014/91 it is known to lead the products through a feeding element on which annular electrodes are mounted in two places around the tube.

Both of the above-mentioned methods are encumbered with certain disadvantages which become particularly pronounced during large-scale operations. The depth of penetration and herewith the tube diameter for the systems are thus limited. Moreover, a problem arises in connection with the non-uniformity of the electric field. This gives problems in connection with the heating, boiling or drying of products or materials which require a uniform heating. This is similarly problematic in connection with the heating of products having temperature-dependent conductivity, since the depth of penetration is herewith strongly reduced. Moreover, it also gives rise to problems in relation to the dimensioning of the HF generator, the reason being that the efficiency of the generator is reduced in connection with the heating of products to higher temperatures, for example in connection with boiling or the like.

OBJECT OF THE INVENTION

The object of the invention is thus partly to achieve a uniform and herewith a controllable heating or boiling of a wholly or partly fragmented medium, and partly to achieve a greater depth of penetration in the product.

This object is obtained by a method of the type disclosed in the preamble, which method according to the invention is characteristic in that at least one product electrode connected to the HF generator is placed in the centre of or in the vicinity of the centre of the cross-section of the tube in such a manner that the product substantially surrounds the product electrode or product electrodes.

ADVANTAGES OF THE INVENTION

By placing the product in the feeding element in which there is provided at least one product electrode, so that the product substantially surrounds the product electrode, said product electrode being placed in the centre of or in the vicinity of the centre of the cross-section of the feeding element, it is achieved that the applied field is short-circuited in the inside of the product, which means that the depth of penetration becomes optimal and can be adjusted in accordance with where the product electrode is placed. The product electrode thus serves as an antenna. According to the method, it is possible to achieve a hitherto-unknown depth of penetration for the field. This provides a special advantage in connection with products having dielectric characteristics which are temperature dependent, in that the heat from inside will spread outwards, whereby the product will be heated from inside. This must be seen in relation to hitherto-known heating methods, where the field is applied from the outside, and where the heating is concentrated around the surface of the product and hereby results in a kind of negative feedback, in that the product on the surface, as a function of the heating, is a better electrical conductor, the result being that the current will hereby flow in the surface of the product.

In addition by letting at least two of the electrodes be annular or cylindrical and placing them at a distance axially from one another, said electrodes demarcating a primary heating or boiling zone in the feeding element, a particularly good heating is achieved in a demarcated area.

By leading the product past only one product electrode, said product electrode being disposed in the supply end of the tube, it is achieved that the heating of the product begins from inside and spreads outwards towards the surface of the product gradually as the product reaches the discharge end. Moreover, it is advantageous with only one product electrode in connection with products with characteristics which change nature after heating or boiling. In connection with products which coagulate to form a "solid cross-section", it will not be possible, for example, to lead this past a further product electrode without ruining the characteristics of the product. Moreover, the field and herewith the heating is forced towards the surface of the product, gradually as the product approaches the discharge end, which contributes towards providing a hitherto-unachievable uniformity and quick heating, drying or boiling.

By dimensioning the diameter and cross-section of the product electrode or product electrodes in accordance with the desired degree of heating, there is achieved a simple manner in which to adapt the different products to the method and vice-versa.

The apparatus to be used when carrying out the invention is characteristic in that the apparatus has at least one product electrode connected to the HF generator, which product electrode is placed in the centre of or in the vicinity of the centre of the cross-section of the tube in such a manner that the product substantially surrounds the product electrode or product electrodes which consist of an electrically-conducting material with better conductivity than that of the product.

By placing one or more product electrodes consisting of an electrically-conducting material in the feeding element, a simple and inexpensive embodiment according to the invention is achieved. The electrode or electrodes will thus function as a kind of antenna, and herewith centre the field around that area in which it/they are placed and by electrically connecting the product electrode or electrodes directly to the HF generator, a simple embodiment according to the invention is achieved, in that this embodiment is easy to dimension, the reason being that the field is led directly into the feeding element without external electrodes.

By letting the feeding element be substantially tubular with a random cross-section, said feeding element having a supply end and a discharge end, the possibility is provided for quick heating, boiling or drying of a product, in that this can be supplied and discharged quickly.

By letting the feeding element have at least one primary tube part that demarcates a primary boiling or heating zone, which in turn is demarcated by electrodes which wholly or partly extend around the feeding element, in that the heating of the product takes place in said primary zone, said apparatus also having at least two secondary tube parts which demarcate at least two secondary zones and which border up to the primary part or the primary parts and substantially connect the main part of the electromagnetic field which is radiated from the electrodes but which does not extend directly or indirectly between two electrodes, to frame, an embodiment is achieved whereby the field which is applied is simple to control in connection with continuous operations.

By coupling the secondary tube parts wholly or partly with one or more reactive components, so that the secondary tube parts constitute one or more oscillatory circuits with at least one pole which is tuned substantially to resonance, it is achieved that the secondary fields can be minimized or eliminated by means of external reactive components. The flow-path across the secondary tube parts will thus be eliminated, which means that the field will exist primarily or exclusively in the primary tube part between the electrodes. This means that it becomes possible to carry out a uniform heating, boiling or drying of the product, which is uniform in both the longitudinal and the cross-sectional direction of the product.

By coupling a capacitive reactance in parallel across the inductive secondary tube parts from the interface between the primary tube part and the secondary tube part to frame, said capacitance being tuned in such a manner that the secondary tube parts are in resonance or in the area of resonance, a simple embodiment is achieved which is inexpensive and stable in operation and has all of the aforementioned advantages.

By letting the individual secondary tube part consist of an electrically-conducting structure which wholly or substantially surrounds the secondary tube part and thus short-circuits the electrode to frame, an effective decoupling of the secondary tube part to frame is achieved, in that the secondary heating zone thus becomes homogenous.

By providing an extended electrically-conducting structure which extends from the secondary condenser's connection to the electrodes in over the primary tube part and surrounding a smaller part of the length of same, it is achieved that the field which flows in the primary tube part is symmetrical. The result is that no cold zones arise in the primary tube. A discreet capacitance across the secondary tube part will namely give rise to a non-uniform charge density at the tubular electrode, said charge density being greatest in the area around the terminals of the capacitance. However, the extended tube part in towards the primary tube part will result in the charge density distributing itself homogeneously across the extended tube part, and thereby give rise to a uniform and symmetrical field inside the primary tube part.

By letting the capacitive reactance be a tubular condenser which surrounds the whole of the tube, a uniform and homogeneous charge density is achieved at the terminals of the condenser. This in turn will give rise to a uniform and symmetrical field inside the primary tube, which again means that no cold zones will arise in said tube, without the use of an extended conductive structure.

By carrying out an impedance adjustment with the HF generator by means of capacitances which are inserted in the supply leads between the HF generator and the electrodes, an optimum transfer of power is achieved from the low-impedance generator to the high-impedance system.

By coupling an inductive reactance across the generator which is adjusted in such a manner that it forms a parallel oscillatory circuit with the parasite capacitances that are between the generator's leads and frame or earth, it is achieved that the paths of conductivity across the parasite capacitances are substantially compensated for, and thus do not load or distort the system.

By providing just one product electrode in the area of transition between the primary and the secondary zones in the supply end, so that the tip of the product electrode extends some distance into the primary zone, a preferred embodiment is achieved which is particularly applicable in connection with products which change character from being a fragmented mass to a homogeneous mass as a result of the influence of heat, since an electrode at the discharge end will ruin or damage a desired structure. This embodiment provides the further advantage that the heat will automatically converge from the centre of the tube at the supply end out towards the inside surface of the tube at the discharge end where there is no product electrode. This further contributes towards providing a uniform heating of the product.

By letting the product electrode consist of a streamlined tubular electrode which is secured to the apparatus by means of an elbow outside the heating zone, from where it extends in through the secondary tube part, an advantageous embodiment is achieved with regard to the securing of the product electrode, in that this does not constitute an obstacle to the movement of the product inside the heating zone. Consequently, no possibility arises of parts of the fragmented product sticking to the securing elements for the product electrode, whereby the product would be exposed to a very long period of heating, and moreover could result in the blocking of the tube.

BRIEF DESCRIPTION OF THE DRAWINGS

An example of known technique and two example embodiments according to the invention will now be described in more detail with reference to the drawings, where.

DETAILED DESCRIPTION OF THE PREFERRED EMBODIMENTS

Figure 1:
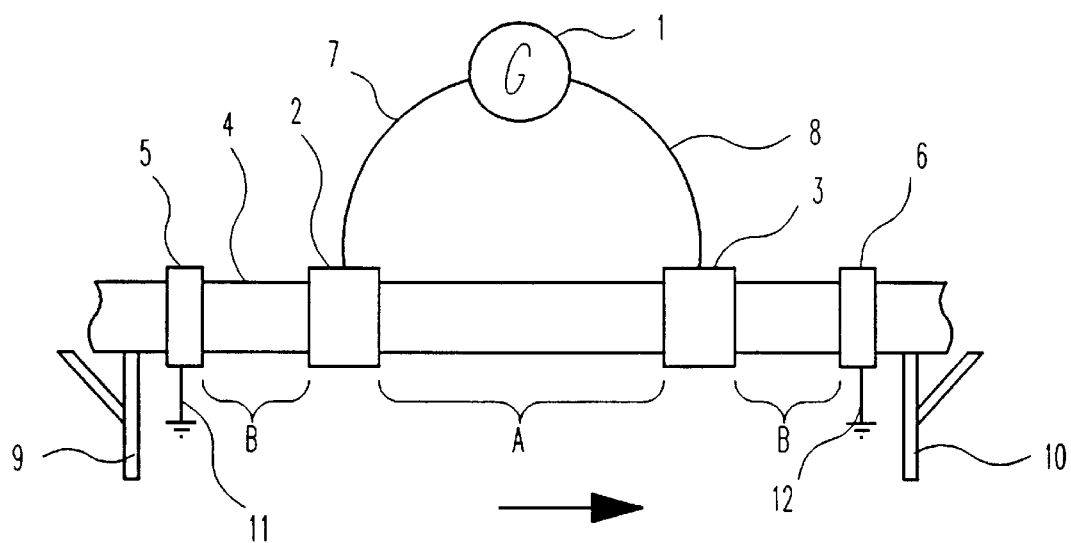
FIG. 1 shows a known heating apparatus.

In FIG. 1 is seen a known heating tube, where a voltage generator 1 is connected to electrodes 2, 3 via leads 7, 8. The electrodes 2, 3 are placed as annular electrodes on the outside of a tube 4 which is not electrically conductive. Two frame electrodes 5, 6 are connected to earth or frame via frame connections 11, 12. The product to be heated is led through the tube 4 in the direction of the arrow. The tube is secured by holding elements 9, 10.

During operation, the way in which the apparatus works is that by means of the generator 1, an electromagnetic field is applied across the electrodes 2, 3. The electromagnetic field will in principle emanate in two ways, i.e. in a primary zone A between the two electrodes, and in two secondary zones B between the electrodes 2, 3 and the frame electrodes 5, 6. Since the fields are applied from outside, problems will arise especially in connection with tubes 4 of larger diameters with regard to the depth of penetration of the electromagnetic field. These problems become particularly great when the product to be heated has dielectric characteristics which are temperature-dependent. In connection with products which have high conductivity as a function of the temperature, a kind of negative feedback will arise in the product in the vicinity of the inner surface of the tube. The electromagnetic field will give rise to a heating of the surface of the product, which in turn contributes towards giving the current which flows in the product a tendency to flow in the surface of the product.

Figure 2:
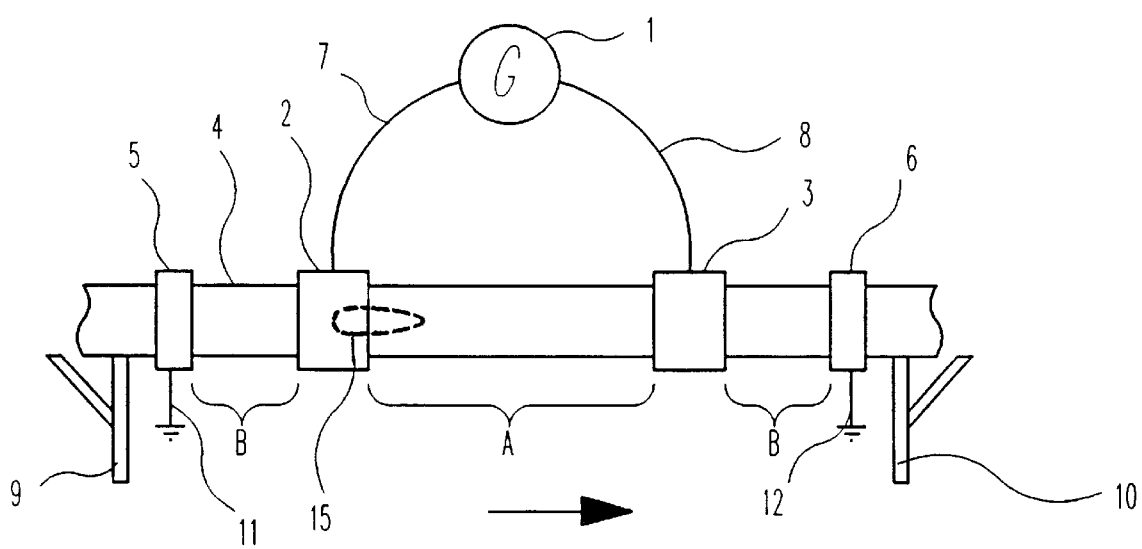
FIG. 2 shows an embodiment according to the invention.

In FIG. 2 is seen an embodiment according to the invention, in that a product electrode 15 is placed in the supply end. The rest of the apparatus corresponds to that shown in FIG. 1. As will be seen, the product electrode 15 extends slightly into the primary zone A in relation to the annular electrode 2. This means that when a field is applied between the electrodes 2 and 3, a current will flow in the product from the tip of the product electrode 15 in the direction of the electrode 3. The product electrode functions as a kind of antenna, and it short-circuits the system so that the electromagnetic field inside the tube 4 emanates from the tip of the product electrode 15. If the tip of the product electrode does not extend forwards in relation to the electrode 2, in principle this will result in the electromagnetic field emanating from the surface of the electrode 2 towards the electrode 3 in quite the same way as in FIG. 1. However, the system can have a certain efficiency, even though the product electrode 15 does not extend forwards in relation to the electrode 2, in that the local heating in the middle of the tube will cause the current which flows to and from the electrode 2 to seek towards the middle of the tube.

If the tip of the product electrode 15 extends forwards, and thus offers a path of the lowest impedance for the electromagnetic field towards the electrode 3, the current will flow between the tip of the product electrode 15 and the electrode 3. The result is that the heat can be said to come from inside, and will spread out gradually as the product moves in the direction towards the electrode 3.

The dimensioning of the product electrode 15 will typically consist of an adaptation of two parameters: the length and the diameter of the product electrode. The parameters must be set in relation to the characteristics of the product, the power and efficiency of the generator in relation to the system and the speed at which the product is fed through the tube.

Figure 3:
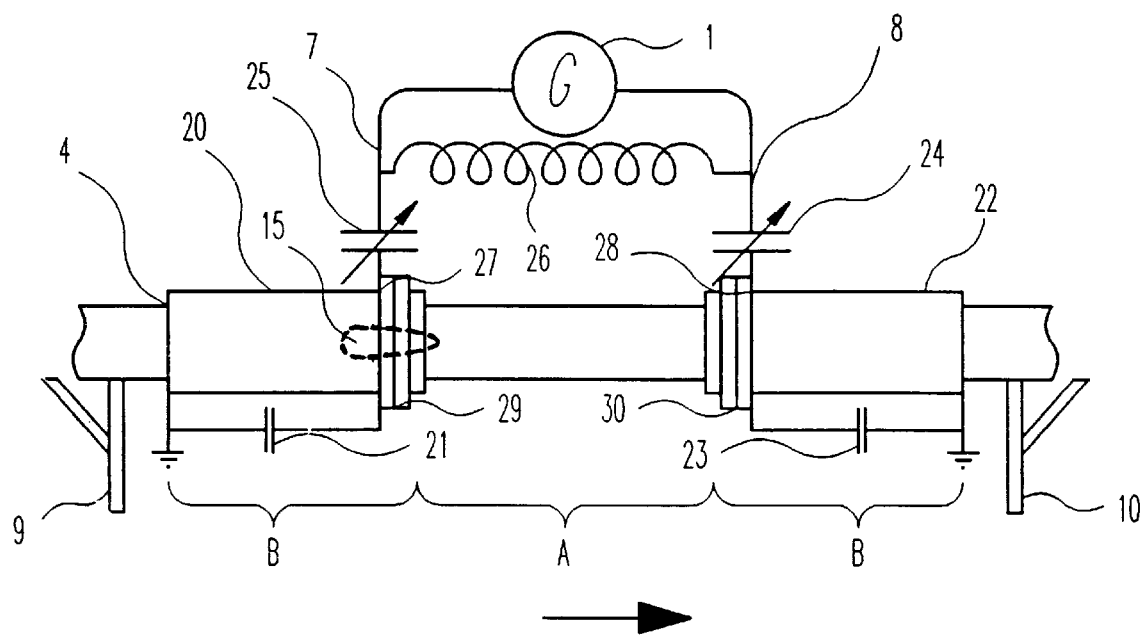
FIG. 3 shows a preferred embodiment according to the invention, and finally

In FIG. 3 is seen the preferred embodiment according to the invention.

The shown embodiment is intended for the heating and boiling of meat products. The meat product is supplied in the direction of the arrow through an electrically-insulating tube 4. The tube is secured by retaining elements 9, 10. Via leads 7, 8, a generator 1 is connected to tubular electrodes 20, 22 on the outside of the tube via trimming capacitances 24, 25 and connection points 27, 28. Across the terminals of the generator there is connected a compensation coil 26 which compensates for parasite capacitances between the terminals and ground. The tubular electrodes are connected directly to frame via ground connections 11, 12.

A product electrode 15 is placed inside the tubular electrode 20. The product electrode 15 is adapted for the system on the basis of the same parameters as those mentioned above.

Two capacitances 21, 23 are connected in parallel across the electrodes 20 and 22. Each electrode functions as an inductance between the supply connections 27, 28 and ground 11, 12. The capacitances 21, 23 are therefore tuned so that the two oscillatory circuits, consisting respectively of the capacitance 21 and the tubular electrode 20 and the capacitance 23 and the tubular electrode 22, are both in resonance or in the area of resonance. Consequently, no current of any significance will flow between the connection point 28 and ground 12, nor between the connection point 27 and ground 11.

This means that the field inside the tube is no longer in several different zones, but is concentrated in the primary zone A. Moreover, this gives rise to the advantage that the product is not "preheated" in the secondary zone before it comes to the primary zone. This is of great significance in connection with the boiling or heating of products which have temperature-dependent dielectric characteristics, in that the preheating in the secondary zone according to FIG. 1 is not particularly concentrated, and succeeds only in heating the border layer up against the tube. This means that when it reaches the primary zone, the product has a heated surface and hereby opposes the function of the product electrode 15, i.e. concentration of the applied electromagnetic field in the middle of the tube.

Extending at the front edges 20, 22 of the tubular electrodes, there are two extended electrically-conducting structures 29, 30. These are in direct electrical connection with the tubular electrodes 20, 22. The result is that the charge density, and herewith the field in the primary tube part, is homogeneous, in that the charges spread uniformly the whole way around the feeding tube 4 on these electrically-conducting structures 29, 30.

The current will hereby flow from the front edge of the electrically-conducting structure 29 in towards the tip of the product electrode 15, and from here towards the extended electrically-conducting structure 30, and from here to the front edge of the tubular electrode 22. Consequently, a very concentrated heating of the product occurs around the front edge, and the heating becomes more and more concentrated in towards the tip of the product electrode 15. Since that part of the product electrode 15 which lies inside the tubular electrode 20 does not conduct any current, a heating will take place exclusively in the area A as shown in the drawing. The areas B will thus not be heating zones, with the exception of the heat which is conveyed to the area B by the product electrode or by the product by means of simple thermal flow.

According to the preferred embodiment, both of the systems shown can be provided with a replaceable feeding tube (not shown) which is configured precisely to suit whatever task it is envisaged to carry out. Electrodes and external reactances can be mounted in a permanent manner on the feeding tube and be adjusted and dimensioned beforehand for precisely this tube, and the system's leads can be provided with plugs. This means that a production change can be effected very quickly.

Figure 4:
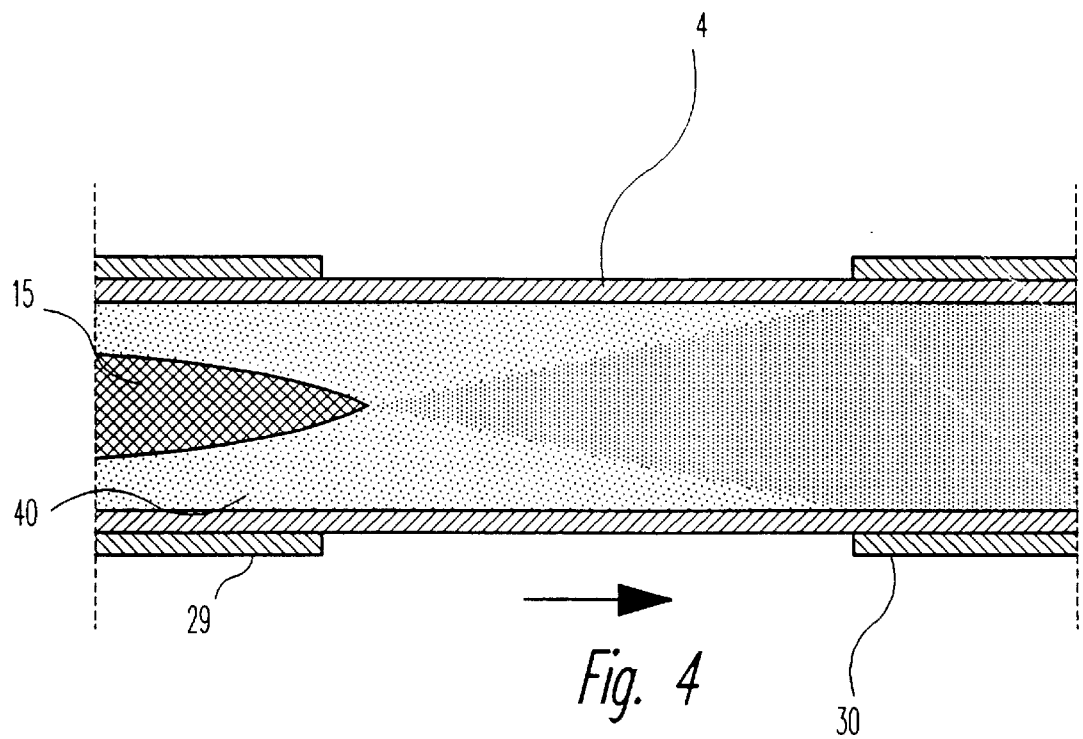
FIG. 4 shows a cross-section in the longitudinal direction of the feeding tube which illustrates the spreading of the heat in the tube.

In FIG. 4 is seen a longitudinal cross-section of the feeding tube 4, where a meat product 40 is led in the direction of the arrow through the tube 4. At each end of the tube is seen the end of the extended electrically-conducting structures 29, 30. In the centre of the tube 4 is seen the product electrode 15, from which the electromagnetic field extends between the tip of the product electrode 15 and the extended conducting structure 30. It is seen how the field, and herewith the heat, spreads towards the surface of the tube 4.

We claim:

1. Apparatus for heat treatment of products, by means of a high-frequency electromagnetic field, the apparatus having a feeding element which is electrically substantially nonconductive and is configured as a tube through which tube the product is fed, the electromagnetic field being generated by at least two electrodes connected with an HF generator and being placed on the outer side of the tube and having no contact with the product, the apparatus comprising: a product electrode connected to the HF generator, which product electrode is placed substantially in the center of the cross-section of the tube in such a manner that the product substantially surrounds the product electrode, the product electrode having an electrically conducting material with better conductivity than that of the product, the product electrode further generating an additional electromagnetic field which is emitted only through a tip of the product electrode, and wherein the feeding element is substantially tubular, said feeding element having an inlet end and a discharge end, whereby the feeding element is at least one primary tube part which demarcates a primary zone, which in turn is demarcated by the at least two electrodes which extend around the feeding element, in that the heating of the product is effected in said primary zone, and in that said apparatus further comprises at least two secondary tube parts which demarcate at least two secondary zones, said secondary tube parts bordering up to the primary part and connecting substantially the main part of the electromagnetic field which is radiated from the electrodes, but which does not extend directly or indirectly between the at least two electrodes, to ground and whereby the product electrode is placed in the area of transition between the primary and secondary zone in the feeding end, so that the tip of the product electrode projects a distance into the primary zone.

2. Apparatus according to claim 1, characterized in that the secondary tube parts are coupled wholly or partly with one or more reactive components, so that the secondary tube parts constitute one or more oscillatory circuits with at least one pole which is tuned substantially to resonance.

3. Apparatus according to claim 1, characterized in that a capacitive reactance having a secondary capacitance, is coupled in parallel across the secondary tube parts from the interface between the primary tube part and the secondary tube part to ground, said secondary capacitance being tuned so that the secondary tube parts are in resonance.

4. Apparatus according to claim 3, characterized in that at connection points of leads to the electrodes there extends an extended electrically-conducting structure in over the primary tube part and surrounds a smaller part of the length of said tube part.

5. Apparatus according to claim 3, characterized in that the capacitive reactance is a tubular condenser which surrounds the whole of the tube part.

6. Apparatus according to claim 1, characterized in that the individual secondary tube part consists of an electrically-conducting structure which wholly or substantially surrounds the secondary tube part and thus short-circuits the electrode to ground.

7. Apparatus according to claim 1, characterized in that an impedance adjustment of the HF generator is carried out by means of capacitances located which are inserted in the supply leads between the HF generator and electrodes.

8. Apparatus according to claim 1 further comprising an inductive reactance coupled across the generator to form a parallel oscillatory circuit with the parasite capacitances which are between the generator leads and ground.

9. Apparatus according to claim 1, characterized in that the product electrode consists of a streamlined tubular electrode which is secured to the apparatus by means of an elbow outside the heating zone, from where it extends in through the secondary tube part.

10. The apparatus of claim 1, wherein the product electrode functions to short circuit one of the electrodes.

* * * * *